United States Patent [19]

Sundseth

[11] 4,394,145
[45] Jul. 19, 1983

[54] AIR CLEANERS

[76] Inventor: Jarl Sundseth, 23 Lennox Gardens, London, S.W. 1, England

[21] Appl. No.: 285,474

[22] Filed: Jul. 21, 1981

[51] Int. Cl.³ .......................................... B01D 45/12
[52] U.S. Cl. .................................... 55/347; 55/348; 55/396; 55/424; 55/457
[58] Field of Search .................... 55/346–348, 55/457, 391, 394, 396, 424, 426

[56] References Cited

U.S. PATENT DOCUMENTS

| 2,004,468 | 6/1935 | Hawley . | |
|---|---|---|---|
| 2,201,301 | 5/1940 | Richardson . | |
| 2,542,549 | 2/1951 | McBride | 55/347 X |
| 2,662,610 | 12/1953 | Heinrich | 55/347 |
| 2,806,551 | 9/1957 | Heinrich | 55/348 X |
| 2,866,518 | 12/1958 | Lincoln . | |
| 3,360,909 | 1/1968 | Barnerias | 55/348 |
| 3,535,850 | 10/1970 | Von Ohain et al. | 55/347 X |
| 3,915,679 | 10/1975 | Roach et al. | 55/347 |
| 4,050,913 | 9/1977 | Roach | 55/347 X |

FOREIGN PATENT DOCUMENTS

| 2526056 | 1/1976 | Fed. Rep. of Germany . | |
|---|---|---|---|
| 618210 | 2/1949 | United Kingdom . | |
| 701593 | 12/1953 | United Kingdom . | |
| 711725 | 7/1954 | United Kingdom | 55/348 |
| 769050 | 2/1957 | United Kingdom . | |
| 910434 | 11/1962 | United Kingdom . | |
| 1083824 | 9/1967 | United Kingdom . | |
| 1192503 | 5/1970 | United Kingdom . | |
| 1207028 | 9/1970 | United Kingdom . | |
| 1209795 | 10/1970 | United Kingdom . | |

Primary Examiner—Kathleen J. Prunner
Attorney, Agent, or Firm—W. R. Hulbert

[57] ABSTRACT

An air cleaner comprising a housing, a plurality of tubular dust separator elements arranged in the housing for generally straight-through flow from one end of the housing to the other, the housing defining around the separator elements a dust collecting chamber. Each separator element has vanes for imparting spin to the air entering it and a circumferential exit of limited angular extent to the dust collecting chamber at a position where the air has substantial circumferential speed. The exits, the direction of spin, and baffles (if any) being arranged to avoid conflicting air flows in the chamber and to ensure that air movement in the chamber outside the exit is in the same direction as air movement within it. Preferably the separator elements impart left and right handed spin to air passing through them, with elements of opposite hand adjacent. In one arrangement the separator elements are arranged in rows with the elements of one row staggered with respect to those of the next, the elements of each row being of the same hand and the elements of adjacent rows of opposite hand, a baffle being disposed between the elements of each row.

7 Claims, 7 Drawing Figures

AIR CLEANERS

This invention relates to air cleaners such as are commonly used with air filters for internal combustion engines. The purpose of the air cleaner is to remove as much dust as possible from the air flow to the filter. This is particularly important for agricultural operations and for earth-moving equipment, for example. The air cleaner of the invention is, however, not restricted to use with a filter or to use with engines.

For use with a filter, an air cleaner (which in this case acts as pre-cleaner) preferably has the form of a panel for assembly over the inlet of the filter.

The invention makes use of tubular dust separator elements where the dust laden air is set into rotation and the dust removed by centrifugal action. The dust separators are arranged in a housing and are designed for generally straight-through flow from one end of the housing to the other.

Dust separator apparatus using tubular separator elements have been proposed where a proportion of the air flow is taken off to entrain the dust. Such scavenge flow cannot economically be arranged in a panel type air precleaner and the invention does not employ it. In the air cleaner according to the invention the housing defines around the separator elements a dust collecting chamber, and the dust leaves the separator elements through exits therein direct to this chamber.

An important object of the invention is to provide an air cleaner of limited depth (i.e. length end-to-end): in a panel-type pre-cleaner compact construction is an important advantage. The separator elements therefore must be short. It is not possible to scale down long separator elements, since inter alia they would be easily plugged and the construction would become too expensive. With a short separator element, however, the air is rotating rapidly adjacent the dust exit with consequent tendency to turbulence such as would inhibit dust separation.

The invention in one aspect accordingly comprises an air cleaner comprising a housing, a plurality of tubular dust separator elements arranged in the housing for generally straight-through flow from one end of the housing to the other, the housing defining around the separator elements a dust collecting chamber, each separator element having means for imparting spin to the air entering it and a circumferential exit of limited angular extent to the dust collecting chamber, at a position where the air has substantial circumferential speed, the exits, the direction of spin, and baffles (if any) being arranged to avoid conflicting air flows in the chamber and to ensure that air movement in the chamber outside the exit is in the same direction as air movement within it.

It will be understood that there is no air flow through the dust exit to the dust collecting chamber. The dust makes its escape by reason of its kinetic energy. The air rotation within the separator element adjacent the exit tends to entrain a similar rotation in the dust collecting chamber outside the exit. With a single element no problem would arise, but with several, conflicting flows would tend to occur especially if the rotation is all in one direction. This would interfere with the flow in the chamber adjacent each exit, and introduce turbulence that can be reflected to the inside of the separator element and that would inhibit dust removal.

The desired smooth flow in the exit region is most readily attained if the air flow in the separators has alternate left and right hand spin.

Various arrangements of separators are possible. In a preferred arrangement, the separator elements are arranged in rows with the elements of one row staggered with respect to those of the next, the elements of each row being of the same hand and the elements of adjacent rows of opposite hand, a baffle being disposed between the elements of each row.

It is important that the dust exits should not be of excessive angular extent; a 60° sector angle has been found appropriate. The exits can then be arranged to avoid conflicting flows in the dust chamber.

Preferably each dust separator has an annular inlet with vanes providing the spin imparting means, an axial air outlet, and an outward annular step between the inlet and the outlet. The step feature referred to has two main effects, (a) it creates a low-pressure area which assists in removing the centrifugal dust particles from the airstream, and (b) it helps to reduce the overall pressure loss through the air passages. The optimum width of this step will vary depending upon the speed of air flowing.

For each separator element the optimum ratio of length to width at its widest point is of the order of 1 or somewhat under. This enables the housing to take the form of a panel of modest depth as well as ensuring the desired air rotation in the region of the dust exit.

An example of filter with which the air pre-cleaner can advantageously be combined is illustrated in my co-pending patent application No.

Two embodiments of the invention will now be described, by way of example, with reference to the accompanying drawings, in which.

Figure 2:
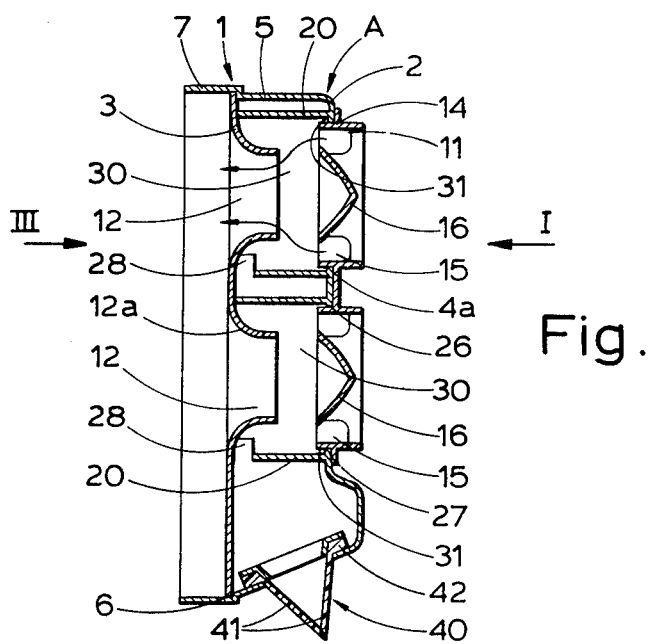
FIG. 2 is a section of the air pre-cleaner on the lines II—II in FIG. 1.
Figure 3:
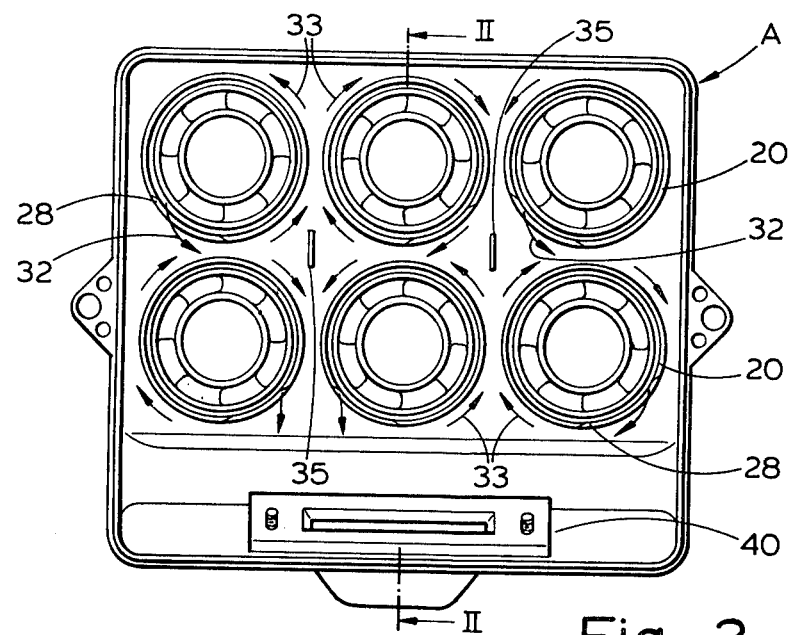
FIG. 3 is a rear elevation of outer end wall (4)
Figure 4:
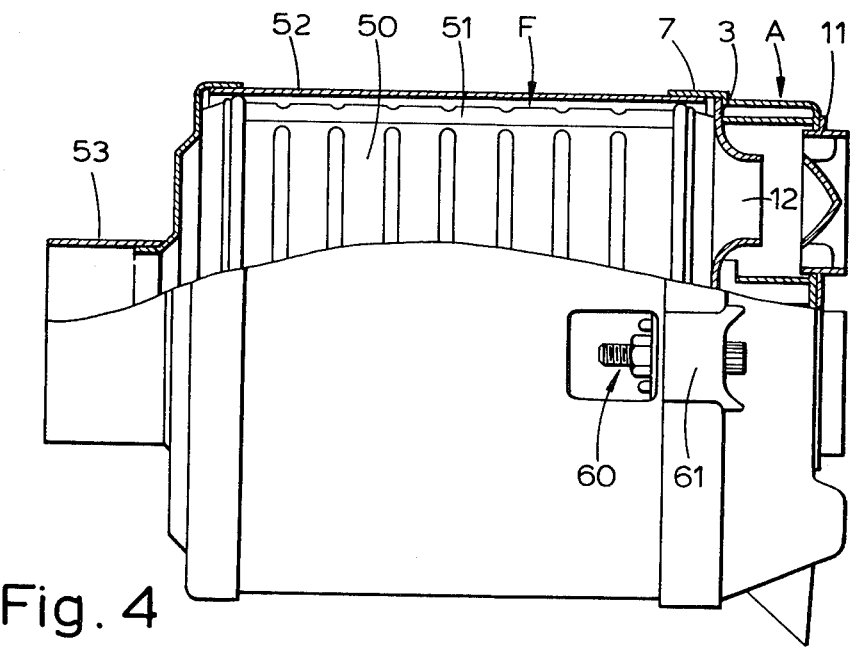
FIG. 4 is a side elevation, with parts shown cut away and sectioned, of the air pre-cleaner assembled with a filter.

Referring to FIGS. 1 to 4, the air pre-cleaner there illustrated is designated generally A. In FIG. 4 it is shown assembled with a filter F.

The air pre-cleaner A comprises a shallow generally rectangular housing designated generally 1 consisting of an outer member 2 and an inner member 3 both moulded of plastics material. The housing 1 covers the end of the enclosure formed by the filter F. The outer member 2 comprises an outer end wall 4 and a peripheral wall 5 of generally rectangular formation as seen in end elevation. The inner housing wall 3 is located by and secured to a step 6 on the peripheral wall 5 of the outer member. The peripheral wall 5 extends beyond the step 6 to form a skirt 7.

Figure 1:
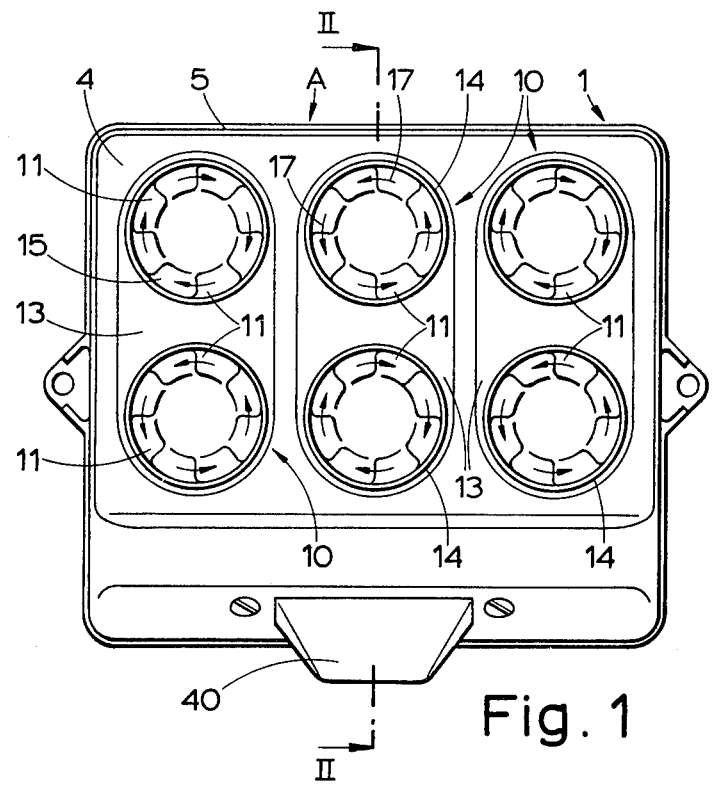
FIG. 1 is a front elevation showing the outer end of an air pre-cleaner, as seen in the direction of the arrow I in FIG. 2.

The end wall 4 of the outer housing member 2 is apertured at 4a to receive three generally similar inlet elements each designated generally 10 and defining a pair of annular inlets 11. The inlet elements 10 are arranged parallel in three rows (the rows are upright as shown in FIGS. 1 and 3). The inlet elements 10 may be plastics mouldings.

The annular inlets 11 are axially aligned respectively with outlet openings 12 defined by flared portions 12a in the inner housing wall 3, with the axes parallel and perpendicular to the general plane of the end wall 4. The flared portion 12a forms a diffuser for air leaving the outlet openings 12.

Each inlet element 10 comprises a flat connecting body 13 with a cylindrical flange 14 at each end forming an annular entry wall 14. Vanes 15 extending radially inward from the flange support a central dome 16. The flange 14 and dome 16 define the annular inlet 11, and the vanes 15 are angled so as to impose a spin in the direction of the arrows 17 upon air entering the inlet. The vanes 15 are so formed as to cause the spin directions at the inlets 11 of each inlet element 10 to be contrary to the spin directions at adjacent inlets of adjacent inlet elements (see FIG. 1).

The outer housing member 2 is formed with deep tubular flanges 20 aligned with the corresponding inlets 11 and outlets 12 and each providing an intermediate annular wall 20. The inner housing member 3 rests against the ends of the flanges 20. The inlet elements 10 seat on the end wall 4 of the outer housing member 2, with the flanges 14 on the elements 10 extending within the flanges 20 on the member 2. Referring generally to FIG. 2, a circular bead is provided on the end wall 4 within each of the tubular flanges 20, e.g. at a position generally indicated by 26 in the drawing, is received within a corresponding annular recess provided around each flange 14, e.g. at a position generally indicated by 27 in the drawing for snap-action assembly of each inlet element 10 on the end wall 4; the arrangement also forms an air seal.

A portion of each tubular flange 20, about 60° of arc, is cut away at its outer end to form a dust exit 28. The arrangement of the dust exits 28 in the dust chamber are shown in FIG. 3. The flanges 20 are bevelled where they define opposite edges of the exit.

It will be seen that the outer diameter of the corresponding inlet 11 is greater than the diameter of the corresponding outlet 12. Each flange 14, flange 20, and outlet 12, form a tubular dust separator designated generally 30 with a peripheral step 31.

The operation of the air pre-cleaner as so far described will now be explained. Air enters the annular inlets 11 of each dust separator 30 and is given a spin in the direction of the arrow 17 by the vanes 15. The rotating air is then drawn inwardly towards the axis of the passage to pass through the outlet 12. The effect of the step 31 is to create a low-pressure area to assist in removing the spinning dust from the airstream and to reduce the overall pressure loss as the air passes through the dust separator 30.

The dust follows the wall of the tubular flange 20 with a spiral motion until it reaches the exit 28 and passes as shown by arrow 32 into the dust chamber formed by the interior of the housing 1. The spinning air within the dust separator 30 in the region of the dust exit 28 tends to entrain the air in the dust chamber to move in a similar direction. If the air flows on both sides of the wall defining the dust exit 28 do not conflict, turbulence in that region is minimised. There is no net air movement through the dust exit 28 since there is no scavenge flow. Turbulence at the dust exit has been found to inhibit dust rejection to a surprising extent, hence the importance of avoiding conflicting air flows in the dust chamber and ensuring that air movement in the chamber outside each exit is in the same direction as air flow within it.

The air flow around the tubular flanges 20 in the dust chamber is shown in FIG. 3 by the arrows 33. It will be seen that the flows between the tubular flanges 20 are like meshing gear wheels. The only possibility of conflicting flows occurs in the spaces between four such tubular flanges 20. Baffles 35 are shown to prevent turbulence in these spaces; they are desirable rather than essential.

The lower portion of the peripheral wall 5 of the outer housing member 2 is angled as illustrated and apertured to mount an elastomeric dust valve member 40 having outwardly directed elastically sealing valve lips 41 and a base flange 42 secured to the wall 5 about the aperture. Dust falls to the bottom of the dust chamber formed by the interior of the housing 1 and when there is a sufficient weight of dust overlying the valve member 40 the valve opens to let the dust fall out.

FIG. 4 shows the air pre-cleaner A assembled with a filter F. The filter F comprises a deep pleated panel type filter element 50 with elastomeric walls 51 within a casing 52 having an outlet 53 at the end opposite the pre-cleaner. The skirt 7 of the air pre-cleaner fits around the periphery of the filter casing 52. The air pre-cleaner A is removably held to the filter casing 52 by a nut and bolt arrangement 60 on each side of the casing which acts on ledges 61 formed in the peripheral wall 5 of the outer housing member 2. The elastomeric wall 51 of the filter element 50 is compressed against the inner housing wall 3 to form a seal which prevents any of the air entering the filter F from leaking around the outside of the cartridge 50.

The air pre-cleaner A is simple to manufacture from relatively few parts. Main parts are the outer and inner housing walls 2, 3, and the identical inlet elements 10. Three simple mouldings only are needed. Although designed for use on the pleated paper filter shown, it could be used on other filters or by itself.

The arrangement described with reference to the drawings is only an example of how the invention can be carried out. Among various alternative constructions, the outer housing wall 2 can be made of sheet metal. While the inlet elements 10 described each provide two inlets, it will be understood that each element could be made to provide three or more. Three inlets could be arranged in a line on one element. Four inlets could be arranged in a square on one element. Alternatively single-inlet elements are envisaged. Such elements could in a single generally tubular moulding provide the stepped flanges 14, 20, the vanes 15 and the dome 16, and be a snap fit in the outer end wall 4.

The number of inlets 11 can vary depending on the expected volume of air flow. In one design according to the invention each inlet can handle about 25 cubic feet of air per minute. Thus, for a pre-cleaner designed for use with a small i.c. engine, three inlets might suffice. For greater flow requirements twelve or more might be used. While, especially with larger numbers, it is preferred to arrange the inlets in rows, with all inlets of each row similar-handed and left- and right-handed rows alternating, this is not absolutely necessary. For any inlet arrangement baffles can be provided, suitably designed to avoid turbulence in the dust space.

Figure 5:
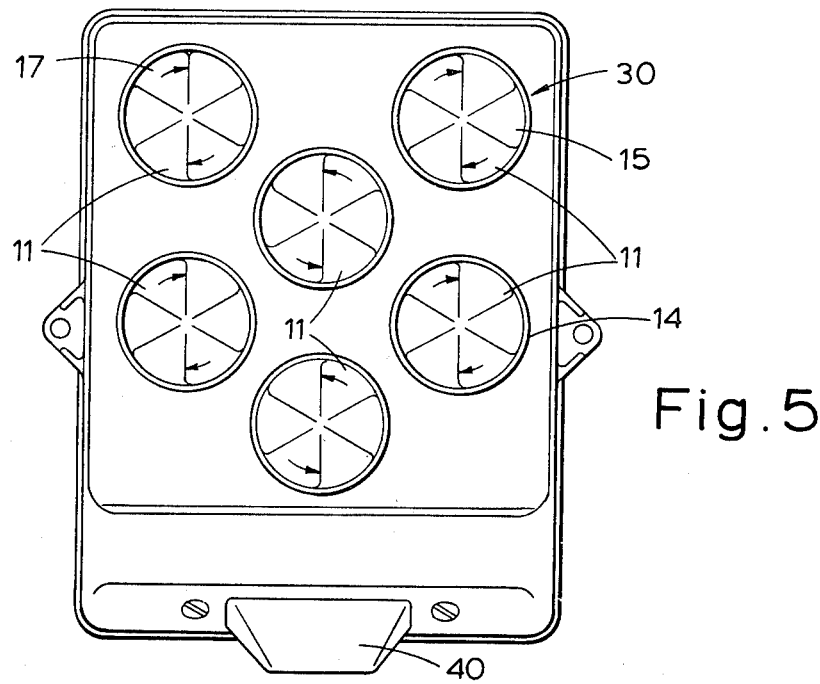
FIGS. 5, 6 and 7 are views similar to FIGS. 1, 2 and 3 of a second form of air pre-cleaner.
Figure 6:
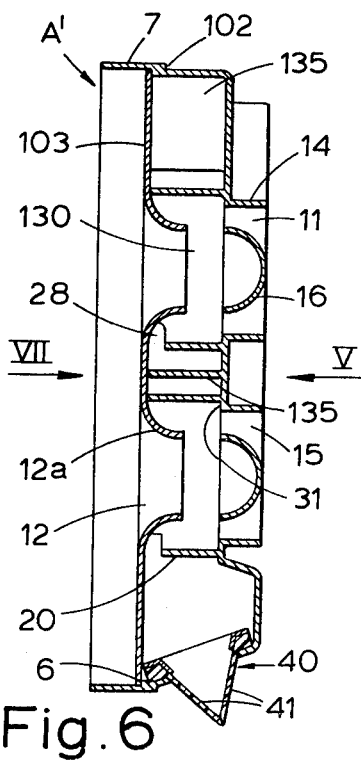
Figure 7:
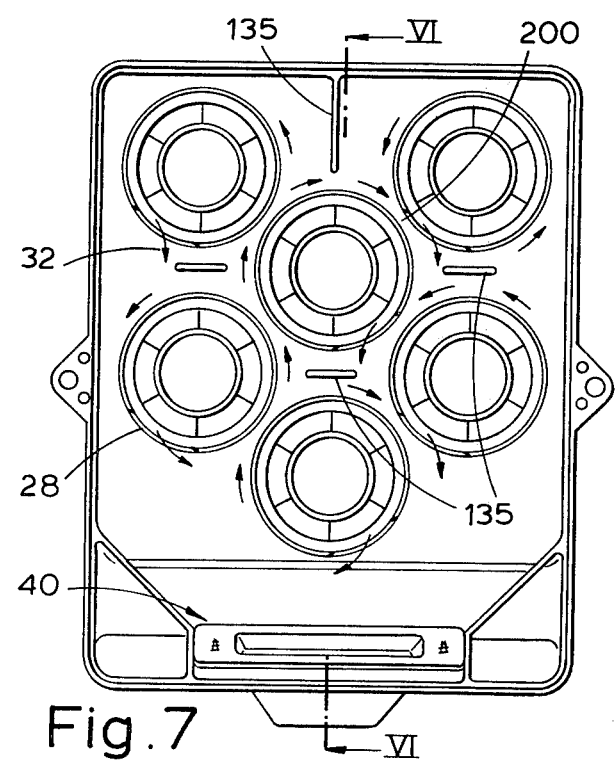

FIGS. 5 to 7 show a second and preferred embodiment of the invention. For similar parts the same reference numerals are used as in FIGS. 1 to 4 and no further description will be needed.

In the second form of air pre-cleaner A' the six dust separator elements 130 are in staggered rows so as to take less space. The elements 130 in each row have their direction of spin of the same hand, and the elements are right-handed, left-handed and right-handed going across the rows as seen in FIG. 5.

The arrangement of dust exits 28 is shown in FIG. 7, and it will be seen that baffles 135 are disposed between separator elements 130 of the same row, where conflicting flows could otherwise occur. The exits 28 are arranged at the same angle for each of the separators of a row. Air circulation in the dust chamber forms a clearly defined pattern around the elements. At the point 200, for example, air flows between the two elements and across the dust exit 28 of the top right-hand separator which has its trailing edge at that point. The same flow takes place adjacent other separator elements.

The construction of the pre-cleaner A' differs from that of the earlier figures also in being essentially a two-piece construction of outer and inner members 102, 103 with the outer member having the domes 16 and vanes 15 formed integrally. The pre-cleaner A' can be designed for any number of dust separator elements 130 in a row.

The air pre-cleaner A' can be used with a filter as shown in FIG. 4 for the pre-cleaner A.

It will be noted that the ratio length of air separator to width at its widest point is less than 1 in both pre-cleaners described. Without the arrangements described for minimising turbulence in the dust chamber this ratio would lead to poor dust separation: the strongly rotating air at the dust exit would set up turbulence that would inhibit dust rejection through the dust outlet. While the exit has been shown as subtending 60° at the axis, this angle could be somewhat greater or less between the limits of, say, 40° and 90°. Too large an angle would make it more difficult to control turbulence, while with too small an angle the dust could not escape freely.

It will be seen that the dust separator elements have an inlet 11 extending about 40% of the total area. In general, a smaller inlet, with faster flow, will tend to improve efficiency of dust separation but too small an inlet will impose resistance to flow: the ratio chosen is a compromise.

A circulatory flow can, if desired, be provided by forming an opening to the dust chamber adjacent the step 31. Some air then enters the separator element at this point, and causes a small air outflow through the dust exit 28.

Although it is preferred to have contra-rotating flow in adjacent separator elements, alternative arrangements may be considered in suitable circumstances if some loss of efficiency may be tolerated. If the separator elements are arranged in horizontal and vertical rows and all of similar-handed rotation, baffles of circular outline may be provided in the centre of every four-element group.

I claim:

1. An air cleaner comprising a shallow housing having a first outer end wall and a second inner end wall, said inner and outer end walls connected by a peripheral wall, a plurality of tubular dust separator elements arrayed in the housing for generally straight through flow of air across the thickness of said housing, wherein each separator element comprises
    a tubular portion having inner and outer generally cylindrical surfaces,
    an annular inlet generally defined by said first outer end wall of said housing, said inlet further defined by an annular inlet wall and a central dome,
        the inner surface of said tubular portion being of greater diameter than the inlet wall,
    inclined vanes connecting said annular inlet wall and said central dome adapted to impart spin to dust-laden air entering said inlet,
    an air outlet generally defined by said second, inner end wall of said housing, said wall having an annular portion extending from the surface thereof toward said air inlet,
        said air outlet of smaller diameter than said inlet and coaxial with said inlet and the inner surface of said tubular portion,
    an annular space remote to said inlet defined by at least the inner surface of said tubular portion and by the annular inwardly extending portion of the inner housing wall,
    a circumferential dust exit defined in said tubular portion adjacent to said annular space, said exit extending over a limited arc within the range 45° to 90°,
    the housing defines about the separator elements a closed dust collection chamber, said chamber containing means for guiding flow of air in said chamber, the guide means including the generally cylindrical outer surface of said tubular portion, and
    the vanes of the plurality of separator elements being inclined so as to impart left- or right-handed spin to air passing therethrough, with elements having vanes adapted to impart left-handed spin positioned adjacent to elements having vanes adapted to impart right-handed spin in said array of elements,
    whereby dust-laden air entering a first separator element through said air inlet is imparted with left- or right-handed spin and enters said annular space, the circulating air mass in the annular space inducing at the exit a corresponding circulation of an air mass in the dust collection chamber surrounding said first separator element, the opposite direction of flow being imparted to air flow in adjacent separator elements and thereby in the air masses surrounding said adjacent elements reinforcing the circulating flow in the closed dust collection chamber, dust in the spinning air flow mass in the annular space of said first element is directed toward the inner surface of the tubular portion by the imparted spin and held in suspension by the air mass circulating in the annular space, air substantially free of dust leaves said separator element via said air outlet, and dust in the air flow mass passing the exit is separated from the air flow mass in said annular space remote to said inlet by centrifugal force with a radial velocity component and enters the air flow mass in the surrounding dust collection chamber, the dust collection chamber being closed so substantially no air flows through the exit between the separator element and the dust collection chamber.

2. An air cleaner as claimed in claim 1, wherein the separator elements are arranged in rows with the elements of one row opposite those of the next, adjacent elements being of opposite hand.

3. An air cleaner as claimed in claim 2, wherein said guide means further includes a baffle disposed in the dust collection chamber between each pair of diagonally opposed separator elements.

4. An air cleaner as claimed in claim 1, wherein the separator elements are arranged in rows with the elements of one row staggered with respect to those of the next row, the vanes in elements of each row being inclined in the same direction so as to impart spin of the same hand and the vanes in elements of adjacent rows being inclined in the opposite direction so as to impart spin of the opposite hand, the means for guiding flow of air in the dust collecting chamber including a baffle disposed in said chamber between the elements of each row.

5. An air cleaner as claimed in claim 1, wherein each of the exits are of the order of 60° angular extent.

6. An air cleaner as claimed in claim 1, wherein the separator elements are arranged in rows with the elements of one row opposite those of the next, adjacent elements being of opposite hand, the air guide means including a baffle disposed in the dust collection chamber between each pair of diagonally opposed separator elements.

7. An air cleaner as claimed in claim 1, wherein for each separator element the ratio of length to width at its widest point is less than 1.

* * * * *